Dec. 15, 1964
E. D. HUMMER ETAL
3,161,285
ROTARY BELT CLEANER
Filed June 7, 1963
2 Sheets-Sheet 1
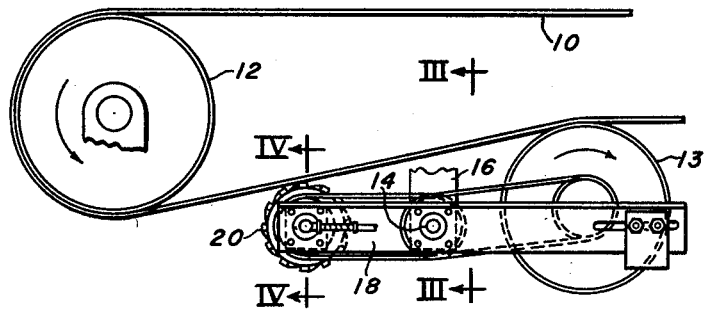
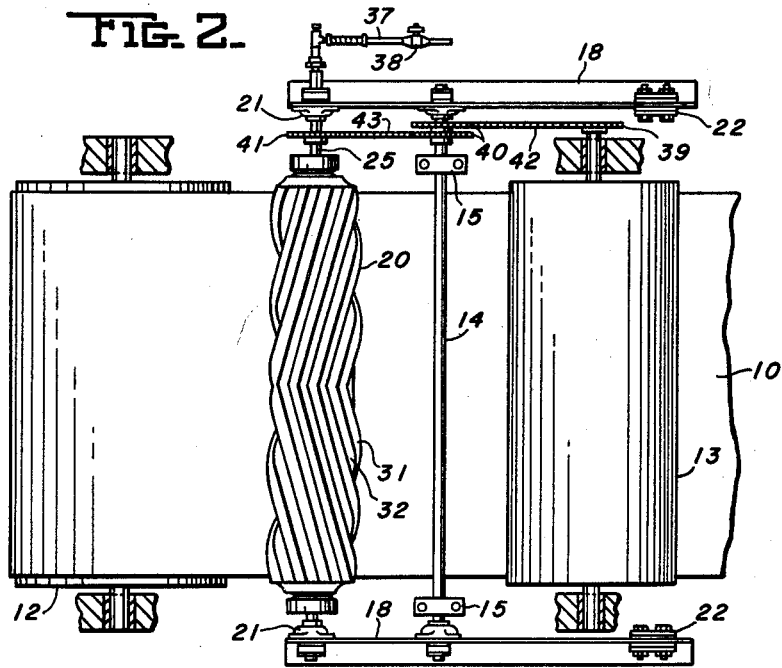
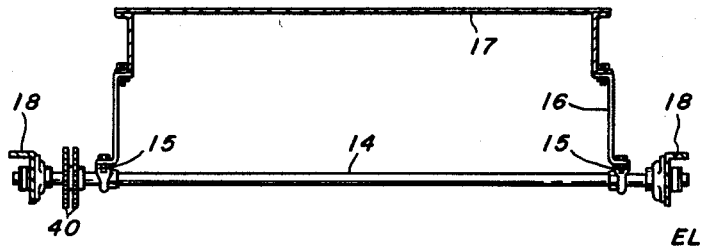
INVENTORS.
ELMER D. HUMMER and
TED T. ZACHWIEJA
By Donald G. Dalton
Attorney

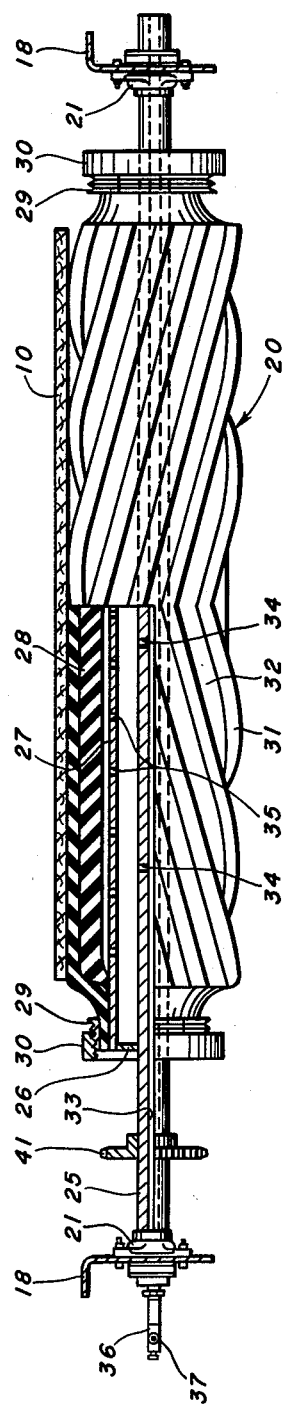

United States Patent Office 3,161,285
Patented Dec. 15, 1964

3,161,285
ROTARY BELT CLEANER
Elmer D. Hummer, 2211 Orchard Way, Bluefield, W. Va., and Ted T. Zachwieja, Box 453, Thorpe, W. Va.
Filed June 7, 1963, Ser. No. 286,899
10 Claims. (Cl. 198—230)

This invention relates to an improved device for cleaning conveyor belts. The present application is a continuation-in-part of our earlier application Serial No. 160,997, filed December 21, 1961.

An object of the invention is to provide an improved belt-cleaning device which continuously wipes clinging material from a conveyor belt without itself becoming encrusted with material from the belt.

A further object is to provide an improved belt-cleaning device which includes an inflatable roller in contact with the return flight of a belt to wipe off clinging material and wherein the roller itself is inflated and deflated at intervals to shed material it picks up from the belt.

In accomplishing these and other objects of the invention, we have provided improved details of structure, a preferred form of which is shown in the accompanying drawings, in which:

FIGURE 1 is a diagrammatic side elevational view of a portion of a conveyor belt equipped with our improved cleaning device;

FIGURE 2 is a bottom plan view of the structure shown in FIGURE 1;

FIGURE 3 is a vertical section taken on line III—III of FIGURE 1; and

FIGURE 4 is a vertical sectional view on a larger scale of the roller embodied in our cleaning device taken on line IV—IV of FIGURE 1.

FIGURE 1 shows a portion of a conveyor belt 10 which runs over a head pulley 12 and is driven by any suitable motive means, not shown. In the installation illustrated, the return flight of the belt runs over a snub pulley 13 journaled to a suitable mounting for maintaining pressure on the belt and thus keeping the belt taut. The mounting illustrated for our cleaning device includes a transverse supporting shaft 14, bearings 15 in which said shaft is journaled, and hangers 16 which suspend the shaft and bearings from the conveyor frame 17 (FIGURE 3). A pair of levers 18 are fixed intermediate their lengths to opposite ends of shaft 14. Our cleaning roller 20 is journaled in bearings 21 at the ends of levers 18 nearer the head pulley 12. The opposite ends of the levers carry adjustable counterweights 22 which hold roller 20 in contact with the underside of belt 10 on its return flight.

As best shown in FIGURE 4, roller 20 comprises a tubular shaft 25, spaced apart end plates 26 welded to the shaft, a pipe 27 surrounding the shaft and welded at its ends to the respective end plates, and a flexible sleeve 28 of rubber or equivalent surrounding the pipe and fixed thereto at its ends. The means illustrated for fixing the rubber sleeve includes respective externally screw-threaded split bushings 29 encircling the ends of the sleeve, and collars 30 threadedly engaged with the bushings. The exterior of sleeve 28 carries a tread formed of alternating helical ridges 31 and grooves 32. Preferably the helices from the left end to the center are left-handed, and those from the right end to the center are right-handed to insure that the belt tracks properly as the sleeve flexes. Shaft 25 has an axial bore 33 and radial perforations 34 which lead from the bore to the annular space between the shaft and pipe 27. This pipe has perforations 35 which lead to the annular space between it and sleeve 28. The end of shaft 25 carries a swivel 36 which communicates with bore 33. A tube 37 is connected to the swivel and extends to a suitable compressed air supply and a solenoid operated control valve 38 (FIGURE 2).

For purposes of illustration, we show our cleaning roller 20 as driven from the snub pulley 13. The shaft on which the snub pulley 13 is mounted carries a drive sprocket 39 of smaller diameter than the pulley. Shaft 14 carries a freely rotatable double sprocket 40, and shaft 25 a driven sprocket 41 keyed thereto, preferably all of the same diameter as sprocket 39. Chains 42 and 43 connect sprockets 39 and 40 and sprockets 40 and 41 respectively. Belt 10 turns the snub pulley clockwise at a peripheral speed equal to its own speed, while the snub pulley drives roller 20 via the sprockets and chains in the same direction at a peripheral speed less than the belt speed. Thus there is relative movement between the belt and roller, whereby the helical ridges 32 wipe clinging material from the return flight of the belt. Typically the belt may travel at a rate of about 500 feet per minute and the periphery of the roller at about 300 to 400 feet per minute. Such relative movement is substantially less than that obtained with a wiper which is stationary or driven in the opposite direction; hence our arrangement reduces wear over such arrangements. Nevertheless it is apparent that many equivalent drives for the cleaning roller are possible. For example, the cleaning roller could be driven independently or from the head pulley 12.

Normally we operate our roller with the rubber sleeve 28 deflated. The sleeve is sufficiently thick-walled and rigid that it bears firmly against the belt even though deflated. At intervals we admit compressed air to the shaft bore 33 to inflate the sleeve and expand it to break loose and shed material wiped from the belt, after which we again deflate the sleeve. It is apparent we can control admission of air manually or else we can employ a suitable automatic control for this purpose. Typically we may inflate the sleeve briefly at about 5 minute intervals, although we may vary this cycle within a wide range depending on the type of material the conveyor carries.

From the foregoing description it is seen our invention affords a simple device for wiping clinging material from a conveyor belt, and a device which itself can be cleaned easily. At the same time the device minimizes wear, both of the belt and itself.

While we have shown and described only a single embodiment of the invention, it is apparent that modifications may arise. Therefore, we do not wish to be limited to the disclosure set forth but only by the scope of the appended claims.

We claim:

1. The combination, with a conveyor which includes a belt having carrying and return flights and pulleys over which said belt runs, of a cleaning device comprising an inflatable roller, means journaling said roller with its peripheral surface in contact with the surface of said belt on its return flight to wipe clinging material from the belt, and means operatively connected with said roller for inflating and deflating it at intervals while rotating to shed from its surface material wiped from the belt.

2. The combination, with a conveyor which includes a belt having carrying and return flights and pulleys over which said belt runs, of a cleaning device comprising an inflatable roller, a tubular shaft on which said roller is mounted, means journaling said shaft in a position in which the peripheral surface of said roller contacts the surface of said belt on its return flight to wipe clinging material from the belt, and means operatively connected with said shaft for inflating and deflating said roller through the shaft bore at intervals while the roller and shaft are rotating to shed from the roller surface material wiped from the belt.

3. The combination, with a conveyor which includes a belt having carrying and return flights and pulleys over which said belt runs, of a cleaning device comprising an inflatable roller having a tread on its peripheral surface, means journaling said roller with its peripheral surface in contact with the surface of said belt on its return flight, a drive operatively connected with said roller for rotating it at a peripheral speed different from the linear speed of said belt to produce relative movement between the belt and the periphery of the roller and thus wipe clinging material from the belt, and means operatively connected with said roller for inflating and deflating it at intervals to shed from its surface material wiped from the belt.

4. A combination as defined in claim 3 in which said drive rotates said roller in a direction that the peripheral surface which contacts said belt travels in the same direction as the belt surface.

5. A combination as defined in claim 3 in which the means journaling said roller includes a tubular shaft, and the means for inflating and deflating said roller includes a swivel connected to said shaft, a tube connected to said swivel, and a valve in said tube.

6. The combination, with a conveyor which includes a belt having carrying and return flights, a head pulley over which said belt runs, and a snub pulley riding against said belt on its return flight and tensioning the belt, of a cleaning device comprising an inflatable roller having a tread on its peripheral surface, means journaling said roller in contact with the surface of said belt on its return flight between said head pulley and said snub pulley, means operatively connecting said snub pulley and said roller for driving said roller from said snub pulley at a rate to produce relative movement between the belt and the periphery of the roller and thus wiping clinging material from the belt, and means operatively connected with said roller for inflating and deflating it at intervals to shed from its surface material wiped from the belt.

7. The combination, with a conveyor which includes a belt having carrying and return flights, a head pulley over which said belt runs, and a snub pulley riding against said belt on its return flight and tensioning the belt, of a cleaning device comprising an inflatable roller having a tread on its peripheral surface, means journaling said roller in contact with the surface of said belt on its return flight between said head pulley and said snub pulley, means operatively connecting said snub pulley and said roller for driving said roller from said snub pulley with the periphery of the roller traveling in the same direction as the belt surface which it contacts but at slower speed to produce relative movement therebetween and thus wiping clinging material from the belt, and means operatively connected with said roller for inflating and deflating it at intervals to shed from its surface material wiped from the belt.

8. The combination, with a conveyor which includes a belt having carrying and return flights, a head pulley over which said belt runs, and a snub pulley riding against said belt on its return flight and tensioning the belt, of a cleaning device comprising a roller which has an inflatable flexible sleeve around its periphery, the outer surface of said sleeve having a helical tread, means journaling said roller with the tread on said sleeve contacting the surface of said belt on its return flight between said head pulley and said snub pulley, means operatively connecting said snub pulley and said roller for driving said roller from said snub pulley with the periphery of the roller traveling in the same direction as the belt surface which it contacts but at slower speed to produce relative movement between the tread and belt surface and thus wiping clinging material from the belt, and means operatively connected with said roller for inflating and deflating said sleeve at intervals to shed from its surface material wiped from the belt.

9. A combination as defined in claim 8 in which the means journaling said roller includes a pair of levers pivotally supported intermediate their lengths on opposite sides of said belt, opposed axially aligned bearings on corresponding ends of said levers in which said roll is mounted, and counterweights on the other ends of said levers for holding said roller against said belt.

10. A combination as defined in claim 8 in which the means journaling said roller includes a shaft supported below said belt and extending transversely thereof, a pair of levers pivotally supported intermediate their lengths on said shaft and on opposite sides of said belt, opposed axially aligned bearings on corresponding ends of said levers in which said roll is mounted, and counterweights on the other ends of said levers for holding said roller against said belt, and in which the means for driving said roller includes a sprocket directly connected with said snub pulley, a double sprocket journaled on said shaft, another sprocket directly connected with said roller, and chains connecting said sprockets.

References Cited in the file of this patent
UNITED STATES PATENTS
1,776,419    Dodge _____ Sept. 23, 1930